US012776868B2

(12) United States Patent
Cui et al.

(10) Patent No.: US 12,776,868 B2
(45) Date of Patent: Oct. 27, 2026

(54) SYSTEMS AND METHODS FOR ENABLING OR DISABLING HARQ FEEDBACK

(71) Applicant: ZTE Corporation, Shenzhen (CN)

(72) Inventors: Fangyu Cui, Shenzhen (CN); Nan Zhang, Shenzhen (CN); Yachao Yin, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 300 days.

(21) Appl. No.: 18/618,736

(22) Filed: Mar. 27, 2024

(65) Prior Publication Data

US 2024/0243859 A1 Jul. 18, 2024

Related U.S. Application Data

(63) Continuation of application No. PCT/CN2022/091236, filed on May 6, 2022.

(51) Int. Cl.
*H04L 1/1867* (2023.01)

(52) U.S. Cl.
CPC .................................. *H04L 1/1896* (2013.01)

(58) Field of Classification Search
CPC ........ H04L 1/1896; H04L 1/08; H04L 1/1822; H04L 1/1854
See application file for complete search history.

(56) References Cited

U.S. PATENT DOCUMENTS

2021/0084639 A1* 3/2021 Höglund ............... H04W 72/51
2022/0173840 A1* 6/2022 Wang .................... H04L 1/1812
2022/0337350 A1* 10/2022 Fu ......................... H04L 1/1822

FOREIGN PATENT DOCUMENTS

CN 111756495 A 10/2020
CN 113748625 A 12/2021
CN 114208098 A 3/2022
EP 4 224 761 A2 8/2023
RU 2767985 C2 3/2022
WO WO-2020/065530 A1 4/2020
WO WO-2020191625 A1 * 10/2020 ........... H04L 1/1896
WO WO-2021/029296 A1 2/2021
WO WO-2021/159436 A1 8/2021
WO WO-2022/205276 A1 10/2022

OTHER PUBLICATIONS

CATT, HARQ operation enhancement for NB-IoT/eMTC, May 19-May 27, 2021, 3GPP TSG RAN WG1 #105-e, R1-2104506, pp. 1-2 (Year: 2021).*
Extended European Search Report for EP Appl. No. 22940631.9, dated Jul. 31, 2024 (11 pages).
Office Action for RU Appl. No. 2024108086, dated Sep. 11, 2024 (with English translation, 15 pages).

(Continued)

*Primary Examiner* — Farid Seyedvosoghi
(74) *Attorney, Agent, or Firm* — Foley & Lardner LLP

(57) ABSTRACT

Presented are systems and methods for enabling or disabling hybrid automatic repeat request (HARQ) feedback. A wireless communication device (e.g., UE) may determine a transmission setting for coverage enhancement (CE). The wireless communication device may determine whether to disable at least one HARQ process according to the transmission setting for CE.

20 Claims, 9 Drawing Sheets

(56) References Cited

OTHER PUBLICATIONS

ZTE, “Discussion on disabling of HARQ feeback for Iot-NTN”, 3GPP TSG RAN WG1 #109-e, R1- 2203241, May 20, 2022, e-Meeting (3 pages).
CATT, “HARQ operation enhancement for NB-IoT/eMTC”, 3GPP TSG RAN WG1 #105-e, R1-2104506, May 27, 2021, e-Meeting (2 pages).
International Search Report and Written Opinion for PCT Appl. No. PCT/CN2022/091236 mailed Dec. 21, 2022 (8 pages).
Lenovo et al., “HARQ enhancement for IoT NTN” 3GPP TSG RAN WG1 Meeting #105, R1-2105621, May 27, 2021, e-Meeting (3 pages).

* cited by examiner

SYSTEMS AND METHODS FOR ENABLING OR DISABLING HARQ FEEDBACK

CROSS-REFERENCE TO RELATED APPLICATION

This application claims the benefit of priority under 35 U.S.C. § 120 as a continuation of PCT Patent Application No. PCT/CN2022/091236, filed on May 6, 2022, the disclosure of which is incorporated herein by reference in its entirety.

TECHNICAL FIELD

The disclosure relates generally to wireless communications, including but not limited to systems and methods for enabling or disabling HARQ feedback.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium of the following. A wireless communication device (e.g., UE) may determine a transmission setting for coverage enhancement (CE). The wireless communication device may determine whether to disable at least one hybrid automatic repeat request (HARQ) process according to the transmission setting for CE.

In some embodiments, the wireless communication device may determine at least one criterion for CE. The wireless communication device may determine to disable the at least one HARQ process, when the transmission setting for CE is lower than the at least one criterion for CE. The wireless communication device may determine to enable the at least one HARQ process, when the transmission setting for CE is higher than, equal to, or satisfying the at least one criterion for CE. In some embodiments, the wireless communication device may determine at least one criterion for CE. The wireless communication device may determine to disable the at least one HARQ process, when the transmission setting for CE is lower than, equal to, or satisfying the at least one criterion for CE. The wireless communication device may determine to enable the at least one HARQ process, when the transmission setting for CE is higher than the at least one criterion for CE.

In some embodiments, the wireless communication device may determine, using a mapping configuration for a plurality of candidate transmission settings, to enable or disable the at least one HARQ process according to the transmission setting for CE. In certain embodiments, the wireless communication device may receive a mapping configuration of candidate transmission settings, via a radio resource control (RRC) signaling, or a system information block (SIB) signaling from a wireless communication node (e.g., a ground terminal, a base station, a gNB, an eNB, a repeater, or a serving node). The wireless communication device may determine, using the mapping configuration, whether to disable a first HARQ process of the at least one HARQ process, according to the transmission setting for CE.

In some embodiments, the wireless communication device may determine to disable the at least one HARQ process when the transmission setting for CE comprises a first type, and may determine to enable the at least one HARQ process when the transmission setting for CE does not comprise the first type. The wireless communication device may determine to enable the at least one HARQ process when the transmission setting for CE comprises the first type, and may determine to disable the at least one HARQ process when the transmission setting for CE does not comprise the first type. In some embodiments, the wireless communication device may determine to enable the at least one HARQ process when the transmission setting for CE comprises a first type. The wireless communication device may determine to disable the at least one HARQ process when the transmission setting for CE comprises a second type.

In some embodiments, the transmission setting for CE may comprise one of CE level 0, CE level 1, CE level 2, or CE level 3. The transmission setting for CE may comprise one of CEModeA or CEModeB.

In some embodiments, the wireless communication device may receive at least one criterion via a radio resource control (RRC) signaling, or a system information block (SIB) signaling from a wireless communication node. The wireless communication device may determine to disable a first HARQ process of the at least one HARQ process, responsive to the transmission setting for CE being lower than the at least one criterion. The wireless communication device may determine to enable the first HARQ process of the at least one HARQ process, responsive to the transmission setting for CE being higher than, equal to, or satisfying the at least one criterion. In some embodiments, the wireless communication device may determine to disable a first HARQ process of the at least one HARQ process, responsive to the transmission setting for CE being lower than, equal to, or satisfying the at least one criterion. The wireless communication device may determine to enable the first HARQ process of the at least one HARQ process, responsive to the transmission setting for CE being higher than the at least one criterion.

In some embodiments, the wireless communication device may determine whether to disable the at least one HARQ process according to at least one of: (i) the transmission setting of CE, (ii) a signaling from a wireless communication node, or (iii) a priority between using the transmission setting of CE and the signaling from the wireless communication node. The wireless communication device may determine whether to disable the at least one HARQ process according to (i) the transmission setting of CE, or (ii) the signaling from the wireless communication node, based on a predefined configuration. The wireless communication device may determine that there is a conflict on whether to disable the at least one HARQ process, between (i) the transmission setting of CE, and (ii) the signaling from the wireless communication node. The wireless communication device may resolving the conflict according to the priority.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
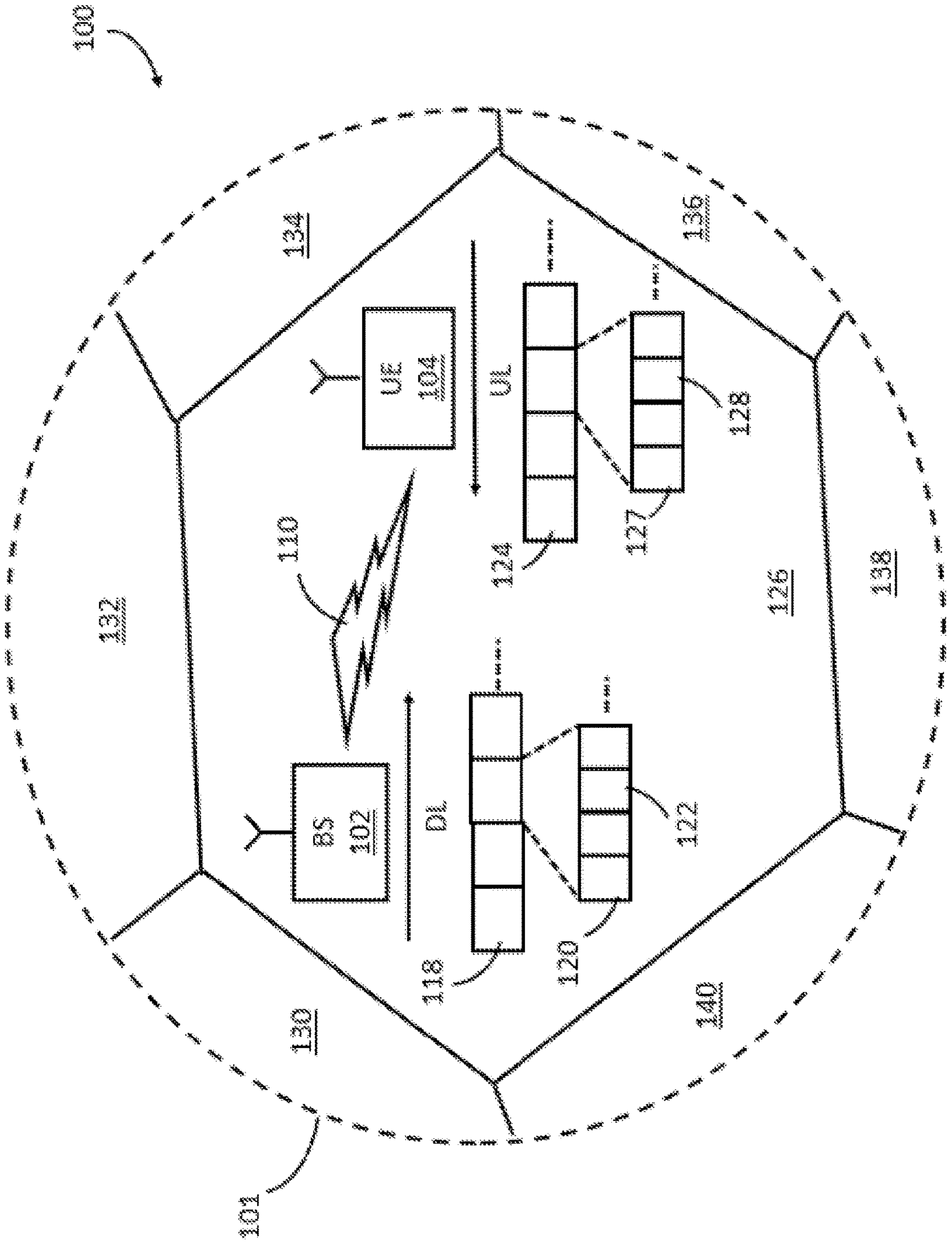
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
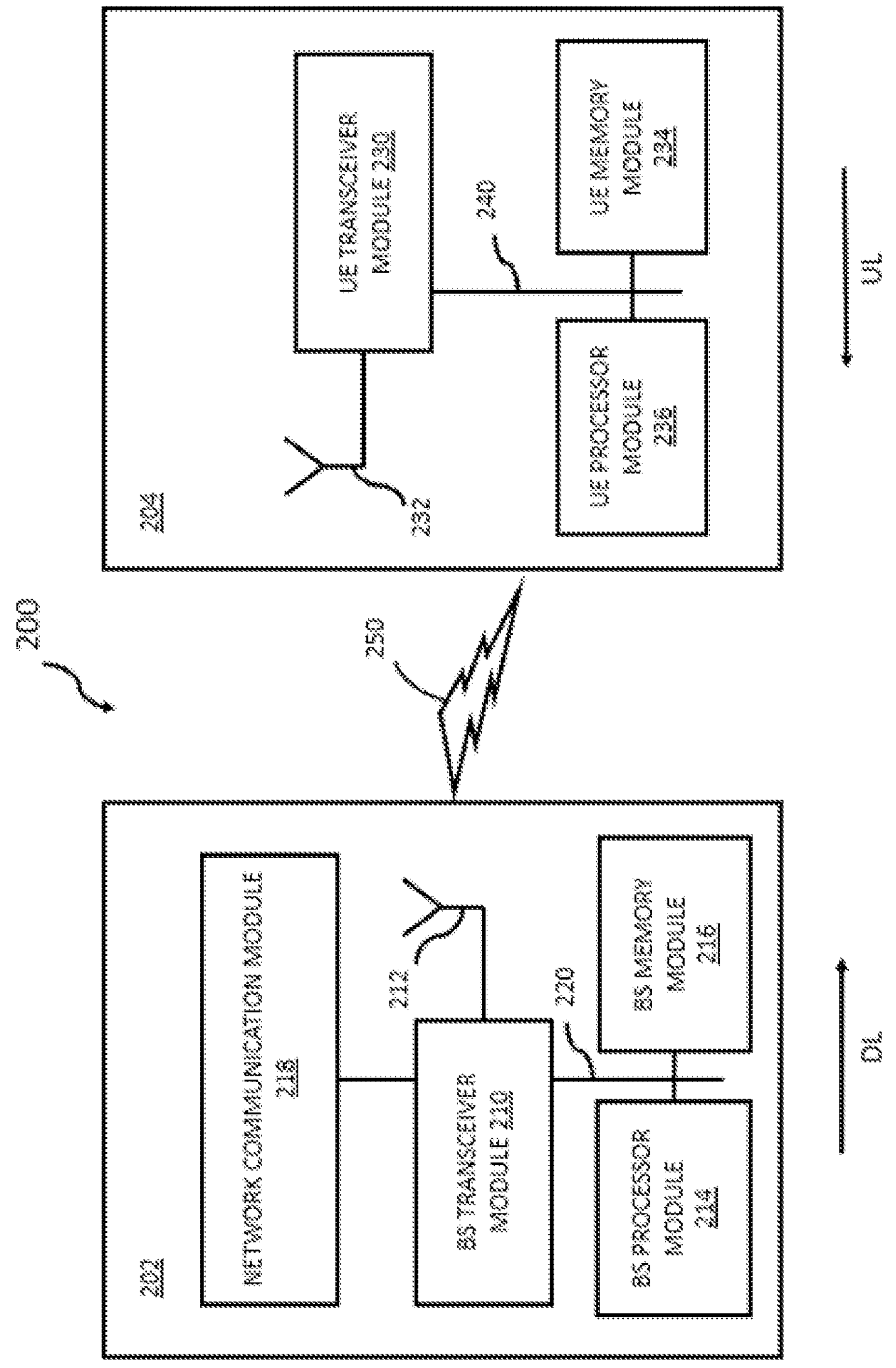
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuity that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for HARQ Feedback Enabling-Disabling Configuration

In a system configured with a hybrid automatic repeat request (HARQ) mechanism, a HARQ process can perform a retransmission after receiving feedback. When a propagation delay is long, e.g., in a non-terrestrial network (NTN), the HARQ process can wait a long time for the feedback (e.g., acknowledgement/response regarding receipt/non-receipt of transmission) before the next transmission. If all of the HARQ processes have completed a transmission but none of the feedback is received due to large round trip time (RTT), a transmitter may stop transmitting and HARQ stalling may occur. For example, in a terrestrial network (TN), RTT can be tens or hundreds of microseconds, which may be negligible compared to scheduling delay and transmission duration. However, in NTN, RTT can be as long as several hundreds of milliseconds, which can be longer than the transmission duration of one TB. In some embodiments, if two HARQ processes are supported, a new transmission scheduling for a first HARQ process cannot be received before a second HARQ process completes its transmission due to large propagation delay of HARQ feedback. As a result, a time interval between the completion time of transmission of the second HARQ process and the start time of the new transmission of the first HARQ process may be wasted (e.g., idle) due to no transmission, i.e., HARQ stalling. In order to avoid the HARQ stalling and to increase throughput, HARQ feedback disabling (e.g., disabling of a portion of the HARQ process that is associated with waiting for the feedback and/or processing of the feedback) can be applied.

However, HARQ feedback disabling can be selective. In order to enhance coverage and increase the detection performance, repetition can be applied for data transmission in Narrowband-Internet of Things (NB-IoT) or enhanced Machine Type Communication (eMTC) over the NTN.

If coverage enhancement (CE) level is high (e.g., more repetitions can be applied to mitigate propagation loss), a transmission duration for one transmission may be longer than the RTT. The HARQ stalling may be less probable even if the RTT may be long, and the HARQ feedback can be enabled to improve detection performance. Otherwise, HARQ feedback can be disabled to improve throughput. The enabling/disabling of HARQ feedback can be configured according to the coverage enhancement level. In certain embodiments, a channel condition can be stable in IoT-NTN since the UEs are mostly static/stationary in position/location. In this disclosure, a semi-static configuration for enabling/disabling of HARQ feedback is discussed, which can be simple and can reduce signaling overhead.

Figure 3:
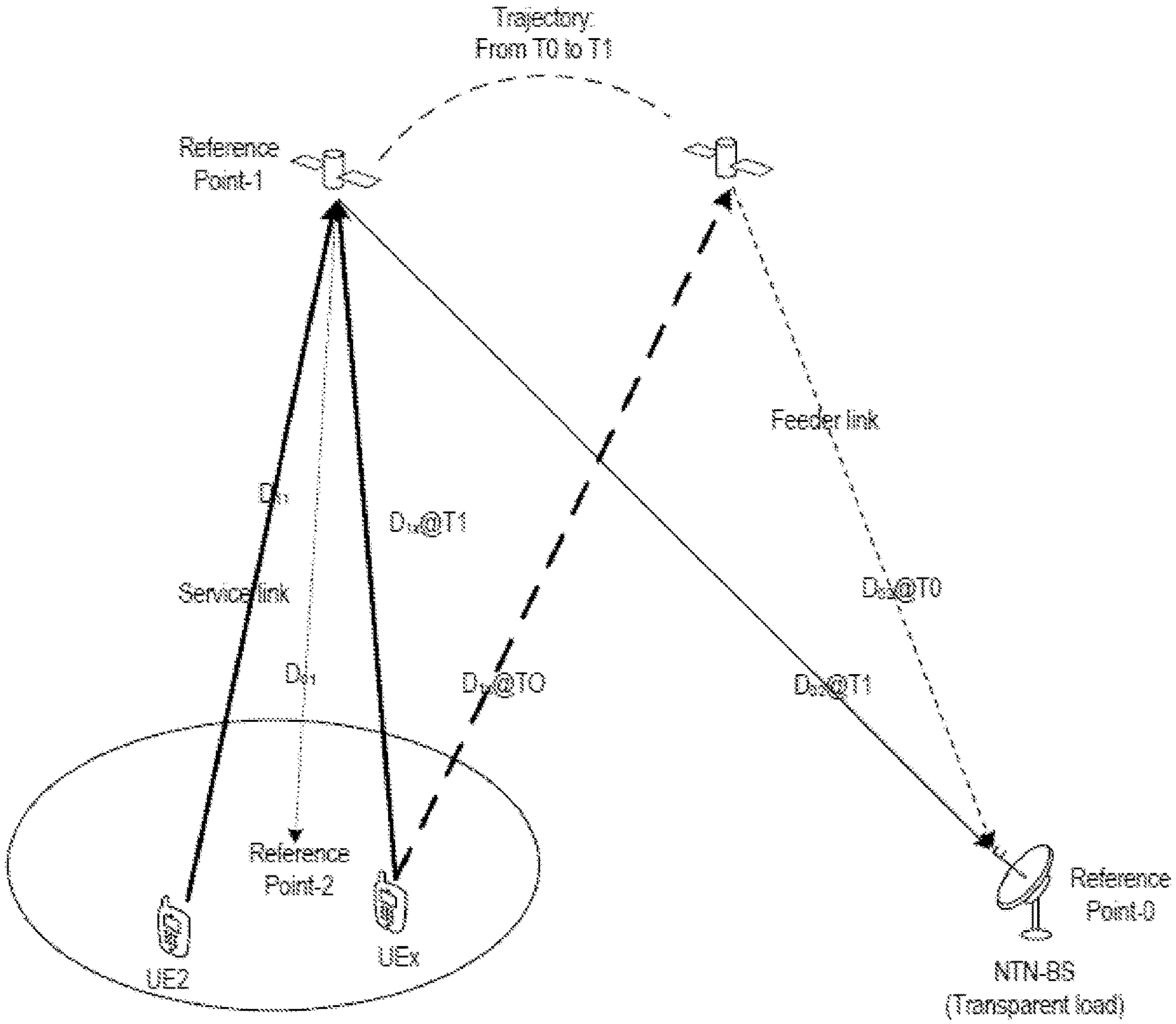
FIG. 3 illustrates an example implementation of a non-terrestrial network (NTN), in accordance with some embodiments of the present disclosure.

FIG. 3 illustrates an example structure of a transparent NTN, in accordance with some embodiments of the present disclosure. A link between a UE (e.g., a user equipment, the UE 104, the UE 204, a mobile device, a wireless communication device, a terminal, etc.) and a satellite can be a service link. A link between a BS (e.g., a base station, the BS 102, the BS 202, a gNB, an eNB, a wireless communication node, etc.) and a satellite can be a feeder link and can be common for all UEs within the same cell. Due to high altitude of the satellite, a propagation delay can be large. For an NTN, especially with the aerial vehicular entity in geosynchronous equatorial orbit (GEO), the RTT between the UE and the BS can be as long as several hundreds of milliseconds due to long (signal transmission/propagation) distance(s). In low earth orbit (LEO), the RTT between the UE and the BS can be a few milliseconds to tens of milliseconds.

In enhanced Machine Type Communication (eMTC) and Narrowband-Internet of Things (NB-IoT), repetition transmission can be applied to enhance the coverage. For example, a physical downlink shared channel (PDSCH) can be configured to be transmitted 128 times to let/allow/enable a UE to combine the repetition/repeated transmissions in detection. When a repetition number of the repetition/repeated transmission is large enough, the receiver can be able to decode a message at very low signal-to-noise ratio (SNR) (e.g., high path loss caused by larger coverage range can be mitigated).

Different types of transmission settings can be supported to serve different scenarios. In order to handle/manage/manipulate different scenarios, multiple CE levels (e.g., transmission settings) can be defined in NB-IoT and/or eMTC. In NB-IoT, there can be three types of CE levels, including CE level 0 (e.g., small number of repetitions), CE level 1, and CE level 2 (e.g., large number of repetitions). The multiple CE levels (e.g., CE level 0, CE level 1, and CE level 2) can handle scenarios where a maximum coupling loss (MCL) equals to 144 dB, 154 dB, and 164 dB (e.g., a higher MCL may indicate that a channel attenuation can be worse), respectively. In eMTC, there can be four types of CE levels, including CE level 0, CE level 1, CE level 2, and CE level 3. The multiple CE levels can be defined for idle mode/state (e.g., IDLE mode). In some embodiments, there can be two types of CE modes, including CEmodeA (e.g., small number of repetitions) and CEmodeB (e.g., large number of repetitions). The multiple CE modes can be defined for connected mode/state (e.g., RRC_CONNECTED mode). With different CE levels or CE modes, a UE and a BS may choose different repetition numbers to mitigate channel loss/attenuation.

Figure 4:
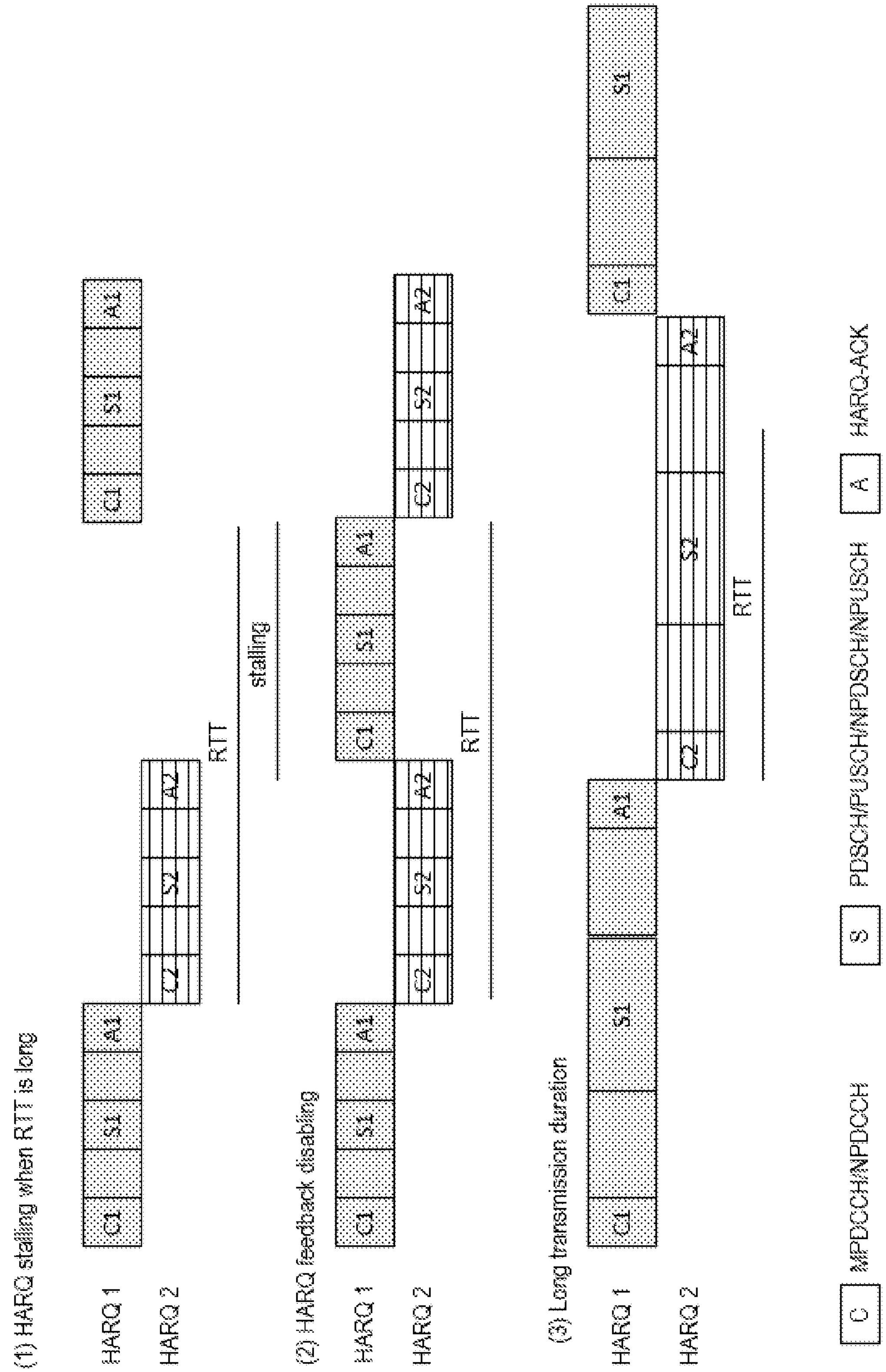
FIG. 4 illustrates an example representation of hybrid automatic repeat request (HARQ) stalling and HARQ feedback disabling, in accordance with some embodiments of the present disclosure.
Figure 5A:
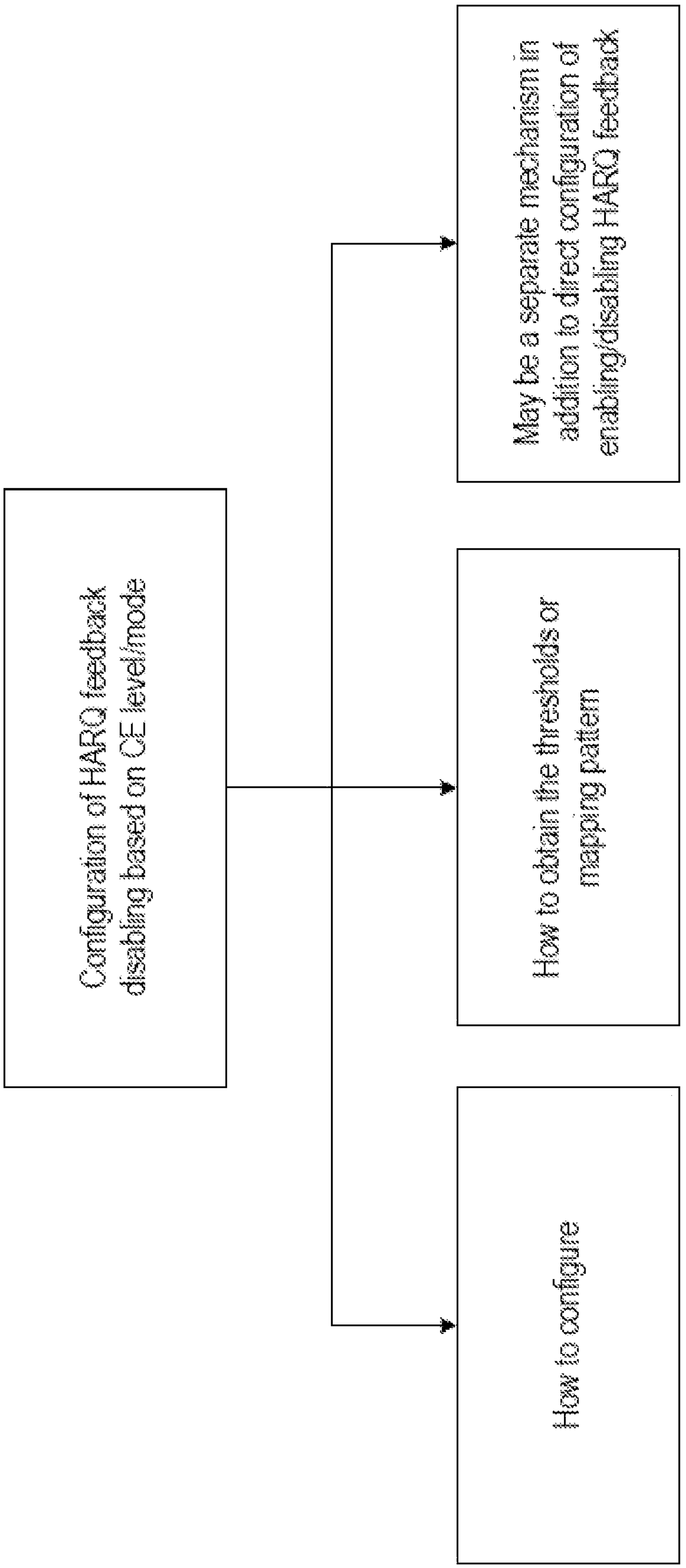
FIGS. 5A-5D illustrate aspects of configurations for enabling or disabling HARQ feedback, in accordance with some embodiments of the present disclosure.
Figure 5B:
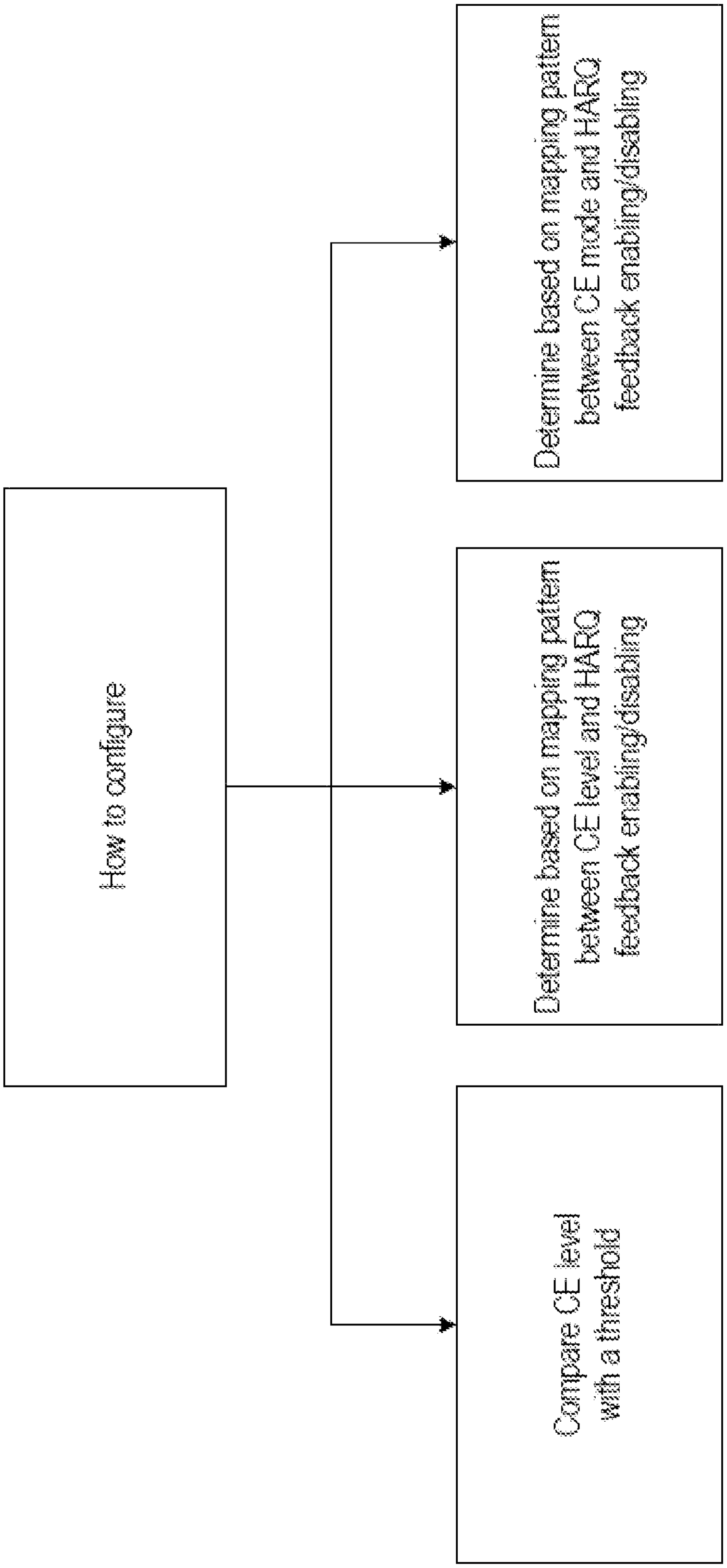
Figure 5C:
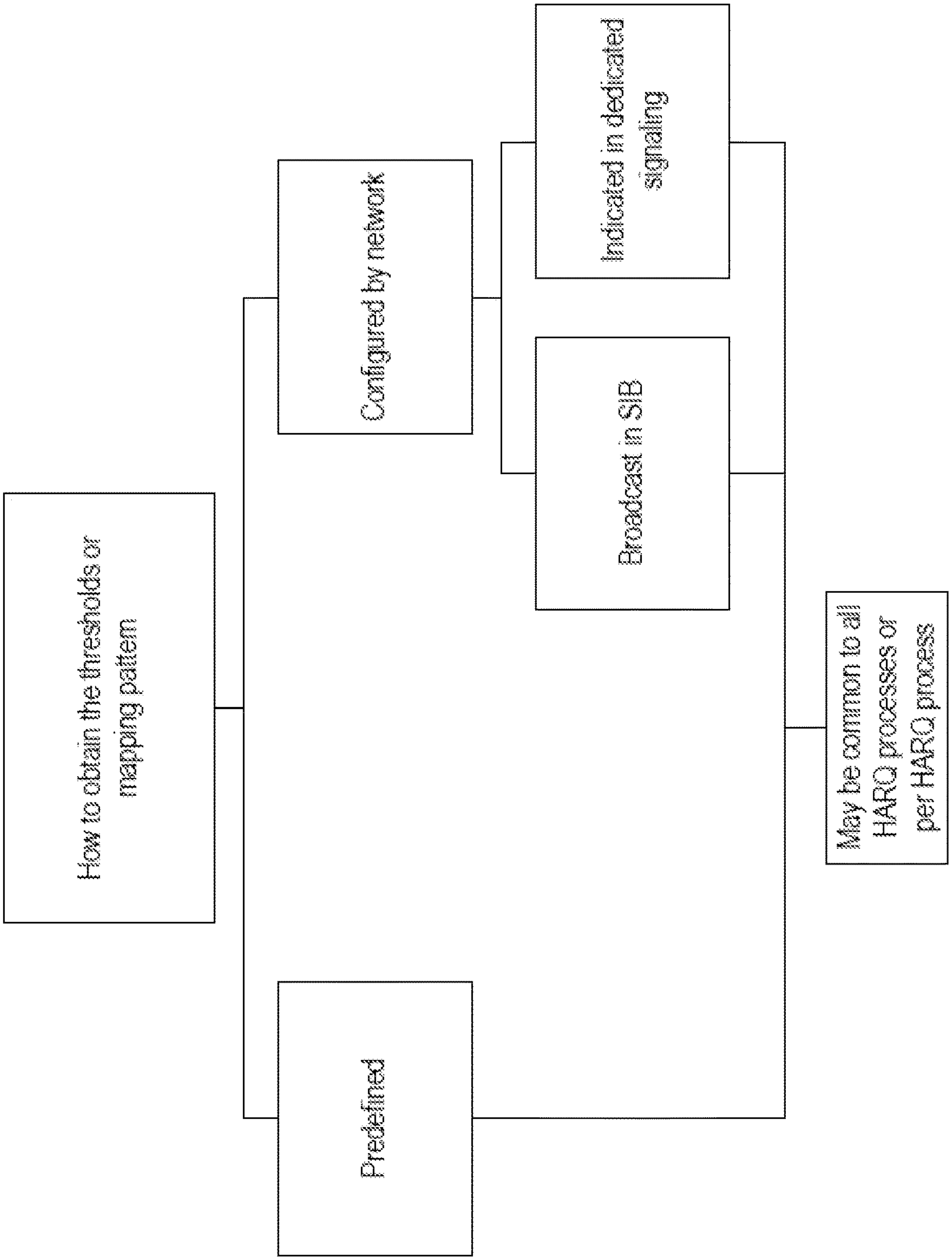
Figure 5D:
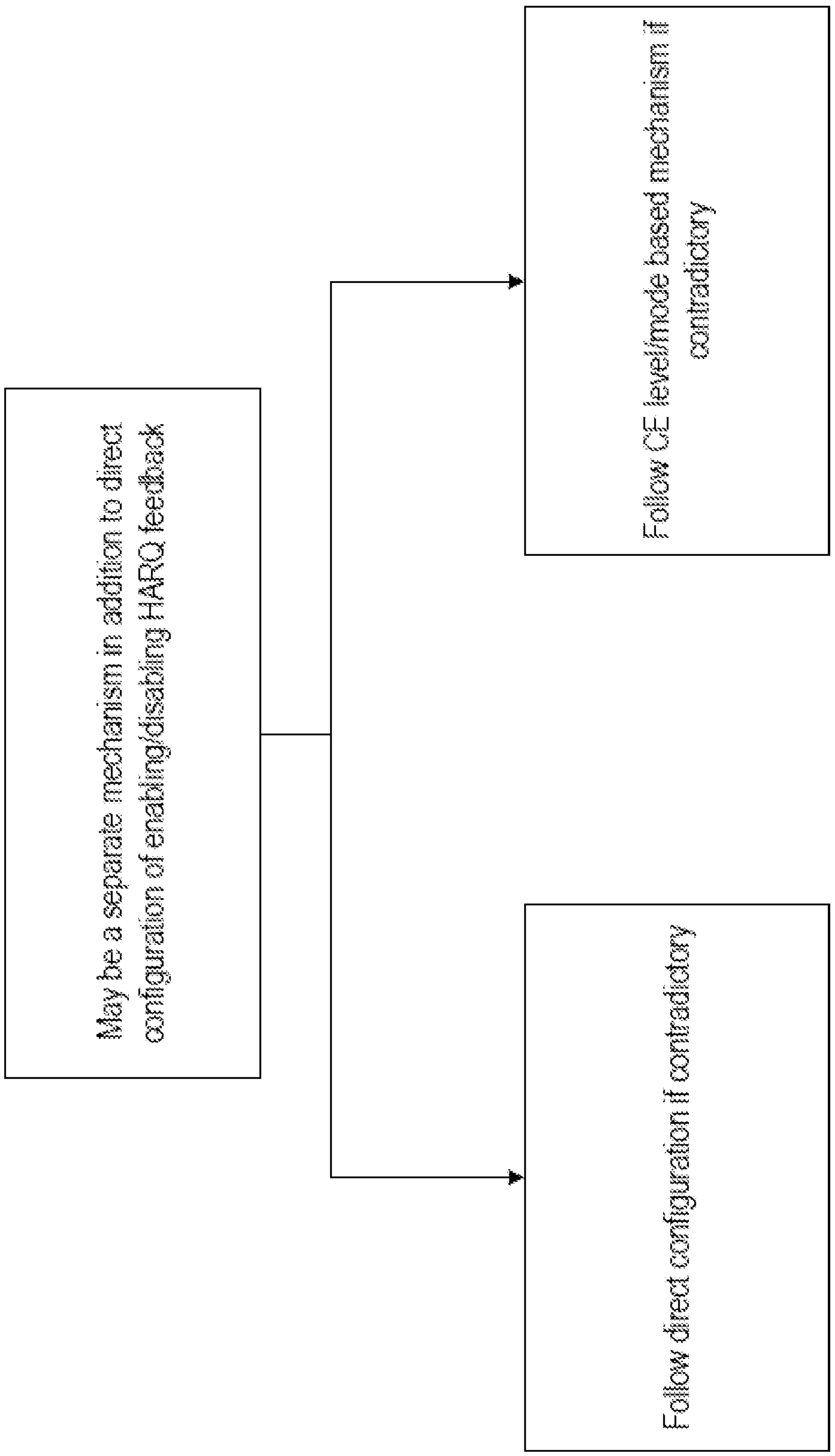

FIG. 4 illustrates representations of HARQ stalling and HARQ feedback disabling, in accordance with some embodiments of the present disclosure. HARQ stalling with a long RTT (e.g., a low CE level) is shown in (1) of FIG. 4. The HARQ feedback disabling can be implemented at least for new radio (NR)-NTN. By disabling the HARQ feedback of one HARQ process, the UE can continuously transmit new transport blocks (TBs) without performing a stop and wait procedure as shown in (2) of FIG. 4. As a result, the HARQ stalling due to a large RTT can be avoided and throughput can be increased. However, detection performance can decrease at a same time when there is no HARQ retransmission. Hence, HARQ feedback disabling can be configured in NR-NTN to make a tradeoff between throughput and detection performance.

Repetition can be applied in data transmission (e.g., in IoT-NTN or eMTC) to improve the detection performance at a receiver. If a repetition number (of data transmission) is large enough, a duration of transmitting one TB may be longer than the RTT. In such a case (e.g., a high CE level), the HARQ stalling may be less probable even if HARQ feedback is enabled as shown in (3) of FIG. 4. The disabling configuration can be associated with parameters related to transmission duration, e.g., the repetition number and scheduling delay.

IMPLEMENTATION EXAMPLE 1

A coverage enhancement (CE) level and/or CE mode can impact a selection of repetition number in the transmission in NB-IoT and eMTC. With a larger repetition number, a transmission duration of a single transmission block (TB) can be longer and HARQ stalling may be less probable. For a high CE level (e.g., a repetition number is large and HARQ stalling is less probable), a HARQ feedback can be enabled to improve a reliability and/or throughput of transmission. For a low CE level (e.g., a HARQ stalling is more probable), the HARQ feedback can be disabled to improve the reliability and/or throughput of transmission. In some embodiments, similar procedures can be used as described with respect to a single HARQ process.

In some embodiments, there can be two ways to determine a CE level or a CE mode. The UE may determine the CE level or the CE mode based on a reference signal receiving power (RSRP) measurement for instance. In certain embodiments, the network may configure/specify/indicate/set a CE level or CE mode to apply. The UE may use the configured, by the network, CE level or CE mode for initial access regardless of the RSRP measurement.

In some embodiments, the UE may determine whether to disable at least one HARQ process according to (e.g., by comparing) a CE level/mode criterion. The CE level/mode criterion can be predefined (e.g., a predefined threshold/criterion) or configured (e.g., determined, calculated, computed) by a BS (e.g., the UE receiving a threshold/criterion from the BS). The criterion may include a threshold value/index, or a certain coverage enhancement requirement/level/scenario. For example, a HARQ feedback can be disabled if the applied/determined/configured CE level/mode index is lower than a threshold value/index, and the HARQ feedback can be enabled if the applied/determined/configured CE level/mode index is higher than, equal to, and/or satisfying the threshold value/index. In certain embodiments, the HARQ feedback can be disabled if the applied/determined/configured CE level/mode index is lower than, equal to, and/or satisfying the threshold value/index, and the HARQ feedback can be enabled if the applied/determined/configured CE level/mode index is higher than the threshold value/index. In certain embodiments, a HARQ feedback can be disabled if the applied/determined/configured CE level/mode is lower than a certain coverage enhancement requirement/level/scenario, and the HARQ feedback can be enabled if the applied/determined/configured CE level/mode is higher than, equal to, and/or satisfying the certain coverage enhancement requirement/level/scenario. In certain embodiments, the HARQ feedback can be disabled if the applied/determined/configured CE level/mode is lower than, equal to, and/or satisfying the certain coverage enhancement requirement/level/scenario, and the HARQ feedback can be enabled if the applied/determined/configured CE level/mode is higher than the certain coverage enhancement requirement/level/scenario. In some embodiments, more threshold values/indexes can be configured to indicate more disabling patterns (e.g., configurations or mapping relationships between threshold values/indexes and corresponding enabling/disabling operations/states).

In some embodiments, the UE may determine whether to disable at least one HARQ process according to a mapping pattern/configuration between CE levels and enabling/disabling operations/states. The mapping pattern/configuration between CE levels and enabling/disabling operations/states can be predefined (e.g., a predefined mapping pattern/configuration) or configured/indicated by a BS (e.g., the UE receiving a mapping pattern/configuration from the BS). For example, the mapping pattern/configuration can be listed/specified in a table (e.g., CE level 0 is to disable, CE level 1 is to enable, and CE level 2 is to enable HARQ-ACK response/process). In some embodiments, any mapping patterns/configurations can be possible. The HARQ feedback can be disabled if the applied/determined/configured CE level corresponds to a disabling operation/state/mode in the mapping pattern/configuration. In certain embodiments, the HARQ feedback can be enabled if the applied/determined/configured CE level corresponds to an enabling operation/state/mode in the mapping pattern/configuration.

In some embodiments, the UE may determine whether to disable at least one HARQ process according to a mapping pattern/configuration between CE modes (e.g., CEmodeA or CEmodeB) and enabling/disabling operation/state/mode. The mapping pattern/configuration between CE modes and enabling/disabling operation/state/mode can be predefined or configured by a BS. In some embodiments, when a UE is in CEmodeA (e.g., small number of repetition), the HARQ feedback can be disabled. Repetition can still be applied for data transmission. When the UE is in CEmodeB, the HARQ feedback can be enabled. In some embodiments, the HARQ feedback can be disabled if the applied/determined/configured CE mode corresponds to a disabling operation/state/mode in the mapping pattern/configuration. Otherwise, the HARQ feedback can be enabled.

IMPLEMENTATION EXAMPLE 2

If threshold values/indexes or mapping patterns/configurations is to be configured by BS, the threshold values/indexes or mapping patterns/configurations can be indicated via a system information block (SIB) broadcast or a radio resource control (RRC) signaling (e.g., a dedicated RRC signaling). The BS may indicate threshold values/indexes or mapping patterns/configurations to the UE in a SIB signaling or a RRC signaling. In some embodiments, the wireless communication device may receive from the wireless communication node, the at least one criterion via a RRC or SIB signaling.

A configuration (e.g., threshold values/indexes or mapping patterns/configurations) may be common to all UEs or a group of UEs within a cell. In such a case, the threshold values/indexes or mapping patterns/configurations can be broadcast/sent via a SIB signaling, which may save/reduce the amount of signaling. In some embodiments, the configuration may be per (e.g., specific to a) UE. In such case, the threshold values/indexes or mapping patterns/configurations can be indicated via a dedicated RRC signaling, which may enable flexible configuration (e.g., on a per-UE basis) to improve performance.

In some embodiments, the configuration (e.g., threshold values/indexes or mapping patterns/configurations) may be per (e.g., specific to a) HARQ process (e.g., independent to whether it is per UE or not). Different threshold values/indexes or mapping patterns/configurations can be defined or configured for different HARQ processes. For example, for a UE with two HARQ processes, a BS may configure that a first HARQ process is enabled when a CE level of the UE is higher than or equal to CE level 1, while a second HARQ process can be enabled when a CE level of the UE is equal to CE level 2. In such a case, when HARQ stalling exists but is not very significant, it can be possible to disable only part of the HARQ processes to achieve tradeoff between throughput and error rate.

In some embodiments, the UE may determine to disable a first HARQ process of the at least one HARQ process, responsive to the CE level of the UE being lower than the at least one criterion. The UE may determine to enable the first HARQ process of the at least one HARQ process, responsive to the CE level of the UE being higher than, equal to, or satisfying the at least one criterion. In some embodiments, the UE may determine to disable a first HARQ process of the at least one HARQ process, responsive to the CE level of the UE being lower than, equal to, or satisfying the at least one criterion. The UE may determine to enable the first HARQ process of the at least one HARQ process, responsive to the CE level of the UE being higher than the at least one criterion.

IMPLEMENTATION EXAMPLE 3

In NR-NTN, a BS can directly configure the enabling/disabling of a HARQ feedback per UE per HARQ process (the HARQ feedback may be always configured in a specific way). In IoT-NTN, the CE level/mode based enabling/disabling of HARQ feedback may be adopted along with the direct configuration mechanism from NR-NTN.

When the two mechanisms (e.g., direct configuration by a BS, or HARQ feedback enabling/disabling according to the CE level/mode) are both adopted and lead to different configurations (e.g., a conflict, or contradictory results), one of them can be selected to have higher priority. For example, if there is a conflict on whether to disable the HARQ feedback (e.g., the direct configuration from the BS indicates to disable the HARQ feedback; the determination of a UE according to the CE level/mode indicates to enable the HARQ feedback), the conflict may be resolved according to a priority between using the direct configuration by the BS and the CE level/mode determination of the UE. For example, if the priority of the CE level/mode determination of the UE is high and the CE level/mode determination corresponds to enabling of HARQ feedback for a HARQ process, the HARQ feedback is enabled no matter/regardless of whether the HARQ process is enabled or disabled via the direct configuration from the BS. For another example, if the priority of the CE level/mode determination of the UE is high and the CE level/mode determination corresponds to disabling of HARQ feedback for a HARQ process, the HARQ feedback is disabled no matter/regardless of whether the HARQ process is enabled or disabled via the direct configuration from the BS. For another example, the UE may follow the direct configuration of HARQ feedback from the BS to disable the HARQ feedback no matter/regardless of which CE level/mode is selected. For another example, the UE may follow the direct configuration of HARQ feedback from the BS to enable the HARQ feedback no matter/regardless of which CE level/mode is selected.

In some embodiments, the UE may determine whether to disable the at least one HARQ feedback according to (i) the transmission setting of CE, or (ii) the signaling from the BS, based on a predefined configuration. The predefined configuration may indicate whether (i) or (ii) is always getting higher priority or always used (instead of using the other). For example, if the predefined configuration (e.g., priority) of the transmission setting of CE is high and the transmission setting corresponds to enabling of HARQ feedback for a HARQ process, the HARQ feedback is enabled no matter/regardless of whether the HARQ process is enabled or disabled via the signaling from the BS. For another example (another predefined configuration), the UE may follow the signaling from the BS to disable the HARQ feedback no matter/regardless of which CE level/mode is selected.

Figure 6:
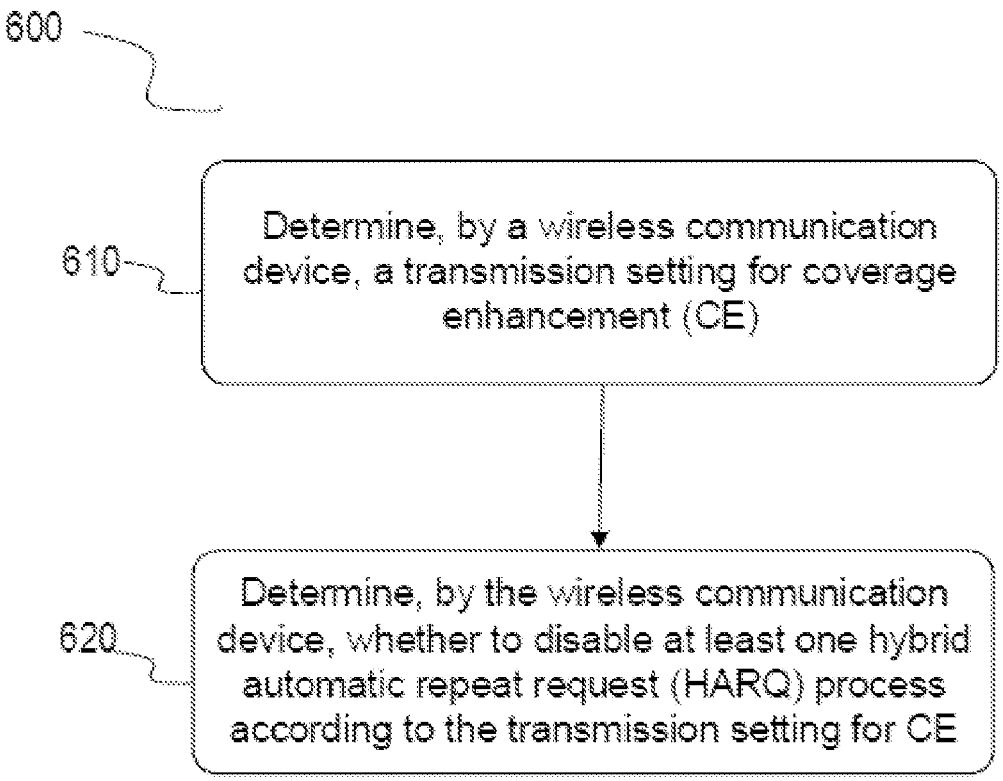
FIG. 6 illustrates a flow diagram of an example method for enabling or disabling HARQ feedback, in accordance with an embodiment of the present disclosure.

FIG. 6 illustrates a flow diagram of a method 600 for enabling or disabling HARQ feedback. The method 600 may be implemented using any one or more of the components and devices detailed herein in conjunction with FIGS. 1-5. In overview, the method 600 may be performed by a wireless communication device (e.g., a UE), in some embodiments. Additional, fewer, or different operations may be performed in the method 600 depending on the embodiment. At least one aspect of the operations is directed to a system, method, apparatus, or a computer-readable medium.

A wireless communication device (e.g., a UE) may determine a transmission setting for coverage enhancement (CE) (e.g., CE levels 0/1/2/3 or CE Mode A/B) (operation 610). The wireless communication device may determine whether to disable/enable at least one hybrid automatic repeat request (HARQ) process according to (e.g., based on, or in response to) the transmission setting for CE (operation 620).

In some embodiments, the wireless communication device may determine at least one criterion (e.g., an actual threshold value/index, or a certain coverage enhancement requirement/level/scenario) for CE (e.g., determining/retrieving a predefined threshold value/index, or receiving a threshold value/index configured by and/or sent from a BS). The wireless communication device may determine to disable the at least one HARQ process, when the transmission setting for CE is lower than or not satisfying the at least one criterion (e.g., threshold or condition) for CE. The wireless communication device may determine to enable the at least one HARQ process, when the transmission setting for CE is higher than, equal to, or satisfying the at least one criterion for CE. In some embodiments, the wireless communication device may determine (e.g., access/retrieve/receive) at least one criterion for CE. The wireless communication device may determine to disable the at least one HARQ process, when the transmission setting for CE is lower than, equal to, or satisfying the at least one criterion for CE. The wireless communication device may determine to enable the at least one HARQ process, when the transmission setting for CE is higher than the at least one criterion for CE.

In some embodiments, the wireless communication device may determine, using a mapping configuration/pattern (e.g., a configuration including CE levels 0/1/2/3 or CE Mode A/B (each mapped to a respective/corresponding enabling or disabling action/operation/mode)) for a plurality of candidate transmission settings, to enable or disable the at least one HARQ process according to the transmission setting for CE. In certain embodiments, the wireless communication device may receive a mapping configuration of candidate/potential transmission settings, via a radio resource control (RRC) signaling (e.g., a dedicated RRC signaling), or a system information block (SIB) signaling from a wireless communication node (e.g., a ground terminal, a base station, a gNB, an eNB, a repeater, or a serving node). The wireless communication device may determine, using the mapping configuration, whether to disable (e.g., inactive, block) a first HARQ process (or a part/portion/some) of the at least one HARQ process, according to the transmission setting for CE.

In some embodiments, the wireless communication device may determine to disable the at least one HARQ process when the transmission setting for CE comprises a first type, and to enable the at least one HARQ process when the transmission setting for CE does not comprise the first type. The wireless communication device may determine to enable the at least one HARQ process when the transmission setting for CE comprises the first type, and to disable the at least one HARQ process when the transmission setting for CE does not comprise the first type. In some embodiments, the wireless communication device may determine to enable the at least one HARQ process when the transmission setting for CE comprises a first type. The wireless communication device may determine to disable the at least one HARQ process when the transmission setting for CE comprises a second type.

In some embodiments, the transmission setting for CE may comprise one of CE level 0, CE level 1, CE level 2, or CE level 3. The transmission setting for CE may comprise one of CEModeA or CEModeB.

In some embodiments, the wireless communication device may receive at least one criterion via a radio resource control (RRC) signaling, or a system information block (SIB) signaling from a wireless communication node. The wireless communication device may determine to disable a first HARQ process of the at least one HARQ process, responsive to the transmission setting for CE being lower than (and/or not satisfying) the at least one criterion. The wireless communication device may determine to enable the first HARQ process of the at least one HARQ process, responsive to the transmission setting for CE being higher than, equal to, and/or satisfying the at least one criterion. In some embodiments, the wireless communication device may determine to disable a first HARQ process of the at least one HARQ process, responsive to the transmission setting for CE being lower than, equal to, or satisfying the at least one criterion. The wireless communication device may determine to enable (e.g., activate, resume) the first HARQ process of the at least one HARQ process, responsive to the transmission setting for CE being higher than the at least one criterion.

In some embodiments, the wireless communication device may determine whether to disable the at least one HARQ process according to at least one of: (i) the transmission setting of CE, (ii) a signaling from a wireless communication node, or (iii) a priority between using the transmission setting of CE and the signaling from the wireless communication node. The wireless communication device may determine whether to disable the at least one HARQ process according to (i) the transmission setting of CE, or (ii) the signaling from the wireless communication node, based on a predefined configuration. The predefined configuration may indicate whether (i) or (ii) is always getting higher priority or always used (instead of using the other).

In some embodiments, the wireless communication device may determine that there is a conflict on whether to disable the at least one HARQ process, between (i) the transmission setting of CE, and (ii) the signaling from the wireless communication node. The wireless communication device may resolve the conflict (e.g., if a conflict arises) according to the priority. If no conflict arises, the wireless communication device may determine whether to disable the at least one HARQ process according to both (i) the transmission setting of CE, and (ii) the signaling from the wireless communication node, arriving at (or resulting in) the same determination/result.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:

determining, by a wireless communication device, a transmission setting for coverage enhancement (CE); and determining, by the wireless communication device, whether to disable at least one hybrid automatic repeat request (HARQ) process according to the transmission setting for CE.

2. The method of claim 1, comprising:

determining, by the wireless communication device, at least one criterion for CE; and determining, by the wireless communication device, to disable the at least one HARQ process, when the transmission setting for CE is lower than the at least one criterion for CE, and determining, by the wireless communication device, to enable the at least one HARQ process, when the transmission setting for CE is higher than, equal to, or satisfying the at least one criterion for CE.

3. The method of claim 1, comprising:

determining, by the wireless communication device, at least one criterion for CE; and determining, by the wireless communication device, to disable the at least one HARQ process, when the transmission setting for CE is lower than, equal to, or satisfying the at least one criterion for CE, and determining, by the wireless communication device, to enable the at least one HARQ process, when the transmission setting for CE is higher than the at least one criterion for CE.

4. The method of claim 1, comprising:

determining, by the wireless communication device using a mapping configuration for a plurality of candidate transmission settings, to enable or disable the at least one HARQ process according to the transmission setting for CE.

5. The method of claim 1, comprising:

receiving, by the wireless communication device from a wireless communication node, a mapping configuration of candidate transmission settings, via a radio resource control (RRC) signaling, or a system information block (SIB) signaling.

6. The method of claim 5, comprising:

determining, by the wireless communication device using the mapping configuration, whether to disable a first HARQ process of the at least one HARQ process, according to the transmission setting for CE.

7. The method of claim 1, comprising:

determining, by the wireless communication device, to disable the at least one HARQ process when the transmission setting for CE comprises a first type, and to enable the at least one HARQ process when the transmission setting for CE does not comprise the first type; or determining, by the wireless communication device, to enable the at least one HARQ process when the transmission setting for CE comprises the first type, and to disable the at least one HARQ process when the transmission setting for CE does not comprise the first type.

8. The method of claim 1, comprising:

determining, by the wireless communication device, to enable the at least one HARQ process when the transmission setting for CE comprises a first type; and determining, by the wireless communication device, to disable the at least one HARQ process when the transmission setting for CE comprises a second type.

9. The method of claim 1, wherein the transmission setting for CE comprises one of CE level 0, CE level 1, CE level 2, or CE level 3.

10. The method of claim 1, wherein the transmission setting for CE comprises one of CEModeA or CEModeB.

11. The method of claim 1, comprising:

receiving, by the wireless communication device from a wireless communication node, at least one criterion via a radio resource control (RRC) signaling, or a system information block (SIB) signaling.

12. The method of claim 11, comprising:

determining, by the wireless communication device, to disable a first HARQ process of the at least one HARQ process, responsive to the transmission setting for CE being lower than the at least one criterion, and determining, by the wireless communication device, to enable the first HARQ process of the at least one HARQ process, responsive to the transmission setting for CE being higher than, equal to, or satisfying the at least one criterion.

13. The method of claim 11, comprising:

determining, by the wireless communication device, to disable a first HARQ process of the at least one HARQ process, responsive to the transmission setting for CE being lower than, equal to, or satisfying the at least one criterion, and determining, by the wireless communication device, to enable the first HARQ process of the at least one HARQ process, responsive to the transmission setting for CE being higher than the at least one criterion.

14. The method of claim 1, comprising:

determining, by the wireless communication device, whether to disable the at least one HARQ process according to at least one of: (i) the transmission setting of CE, (ii) a signaling from a wireless communication node, or (iii) a priority between using the transmission setting of CE and the signaling from the wireless communication node.

15. The method of claim 14, comprising:

determining, by the wireless communication device, whether to disable the at least one HARQ process according to (i) the transmission setting of CE, or (ii) the signaling from the wireless communication node, based on a predefined configuration.

16. The method of claim 14, comprising:

determining, by the wireless communication device, that there is a conflict on whether to disable the at least one HARQ process, between (i) the transmission setting of CE, and (ii) the signaling from the wireless communication node; and resolving, by the wireless communication device, the conflict according to the priority.

17. A wireless communication device, comprising:

at least one processor configured to:

determine a transmission setting for coverage enhancement (CE); and determine whether to disable at least one hybrid automatic repeat request (HARQ) process according to the transmission setting for CE.

18. The wireless communication device of claim 17, wherein the at least one processor is configured to:

determine at least one criterion for CE; and determine to disable the at least one HARQ process, when the transmission setting for CE is lower than the at least one criterion for CE, and determine to enable the at least one HARQ process, when the transmission setting for CE is higher than, equal to, or satisfying the at least one criterion for CE.

19. The wireless communication device of claim 17, wherein the at least one processor is configured to:

determine at least one criterion for CE; and determine to disable the at least one HARQ process, when the transmission setting for CE is lower than, equal to, or satisfying the at least one criterion for CE, and determine to enable the at least one HARQ process, when the transmission setting for CE is higher than the at least one criterion for CE.

20. The wireless communication device of claim 17, wherein the at least one processor is configured to:

determine, using a mapping configuration for a plurality of candidate transmission settings, to enable or disable the at least one HARQ process according to the transmission setting for CE.

* * * * *